United States Patent
Cravener et al.

(10) Patent No.: US 10,773,793 B2
(45) Date of Patent: Sep. 15, 2020

(54) ROTOR BLADE LOCKING ASSEMBLY

(71) Applicant: Bell Helicopter Textron Inc., Fort Worth, TX (US)

(72) Inventors: Kyle Thomas Cravener, Watauga, TX (US); Tyler Wayne Baldwin, Keller, TX (US); Jared Mark Paulson, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 20 days.

(21) Appl. No.: 16/055,121

(22) Filed: Aug. 5, 2018

(65) Prior Publication Data

US 2020/0039633 A1 Feb. 6, 2020

(51) Int. Cl.
    *B64C 11/28* (2006.01)
    *B64C 29/00* (2006.01)
    *B64C 27/50* (2006.01)

(52) U.S. Cl.
    CPC .............. *B64C 11/28* (2013.01); *B64C 27/50* (2013.01); *B64C 29/0033* (2013.01)

(58) Field of Classification Search
    CPC ..... B64C 11/28; B64C 27/50; B64C 29/0033; B64C 3/56; B64C 5/02; B64C 5/10; B64C 7/02; B64C 27/28

USPC ........ 416/142, 143, 128, 129, 153; 244/7, 6, 244/12.4, 56, 66
See application file for complete search history.

(56) References Cited

U.S. PATENT DOCUMENTS

| 3,749,515 | A | * | 7/1973 | Covington | .............. | B64C 27/50 |
| | | | | | | 416/143 |
| 5,031,858 | A | | 7/1991 | Schellhase et al. | | |
| 5,868,351 | A | * | 2/1999 | Stamps | ................... | B64C 27/50 |
| | | | | | | 244/12.4 |
| 2016/0152329 | A1 | * | 6/2016 | Tzeng | ................. | B64C 29/0033 |
| | | | | | | 416/134 R |
| 2017/0073068 | A1 | * | 3/2017 | D'Anna | .................. | B64C 27/50 |

* cited by examiner

*Primary Examiner* — Nathaniel E Wiehe
*Assistant Examiner* — Eric A Lange
(74) *Attorney, Agent, or Firm* — Lightfoot & Alford, PLLC

(57) ABSTRACT

A rotor blade locking assembly for locking a rotor blade in a deployed position. The rotor blade locking assembly comprises a locking mechanism configured to be coupled to a blade grip. The locking mechanism comprises a latch and an actuator configured to cause the latch to move between an unlocked position and a locked position. The assembly comprises a locking plate configured to be coupled to the rotor blade. The locking plate comprises a bearing surface configured to bear against a contact surface of the latch, when the latch is in the locked position.

20 Claims, 12 Drawing Sheets

ROTOR BLADE LOCKING ASSEMBLY

BACKGROUND

Rotorcraft include elongated rotor blades that extend beyond the footprint of the remainder of the vehicle. These rotorcraft generally occupy a large amount of space and have a large overall footprint. As such, when these rotorcraft are not in use, they occupy an undesirably large amount of space to store them on aircraft carriers, in hangars, runways, and other spaces. And furthermore, access to hangars and/or other indoor maintenance or repair facilities may be restricted because some types of aircraft may not fit through the doors and/or entrances of such facilities. Accordingly, technology has been developed that allows for the folding of the rotor blades relative to a rotor hub to minimize the footprint of the aircraft when stored. However, current mechanisms for locking rotor blades in the extended position are complex, heavy, and/or require manual manipulation.

DETAILED DESCRIPTION

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

Figure 1:
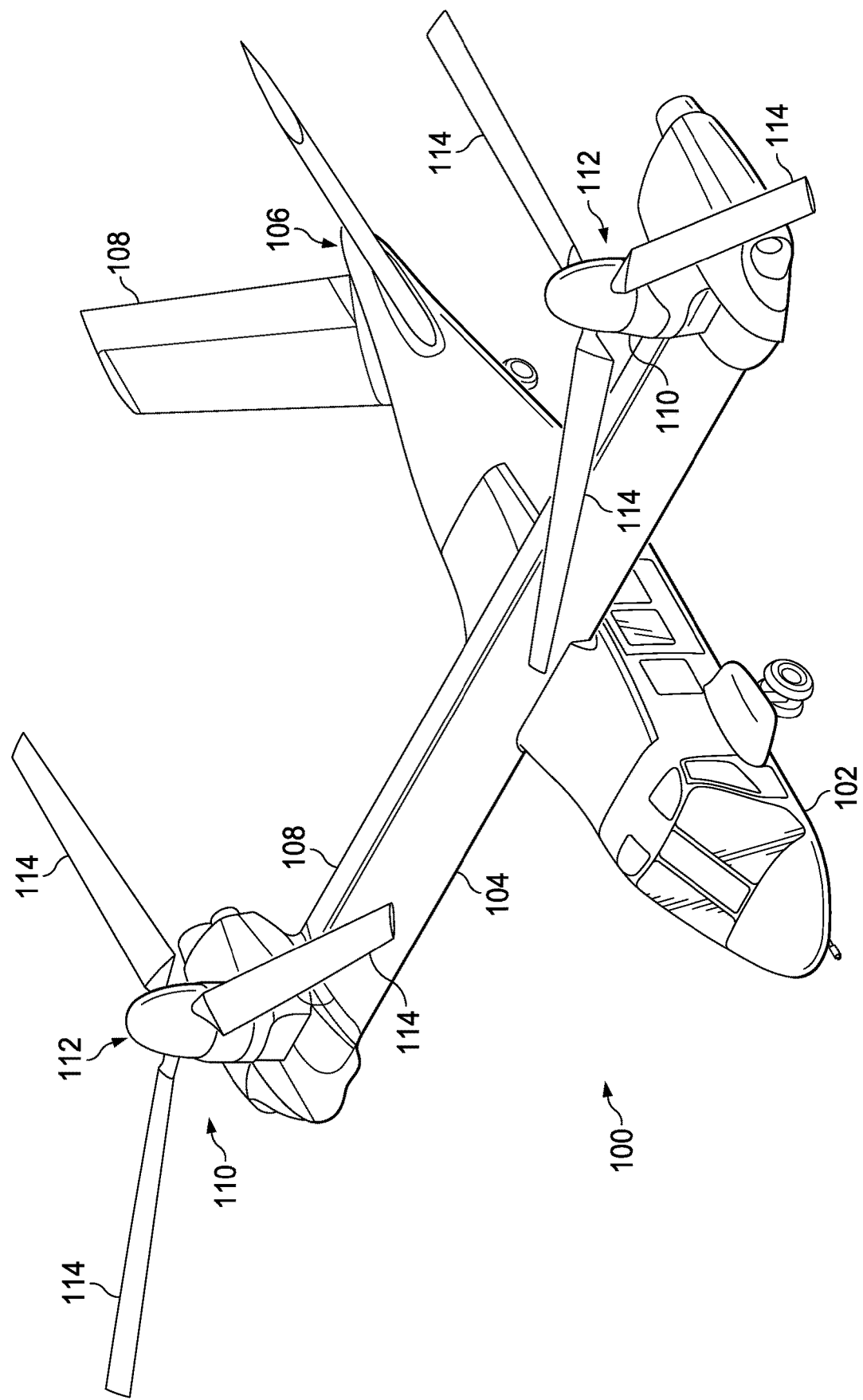
FIG. 1 is an oblique view of a rotorcraft including folding rotor blade assemblies, according to this disclosure.
Figure 2:
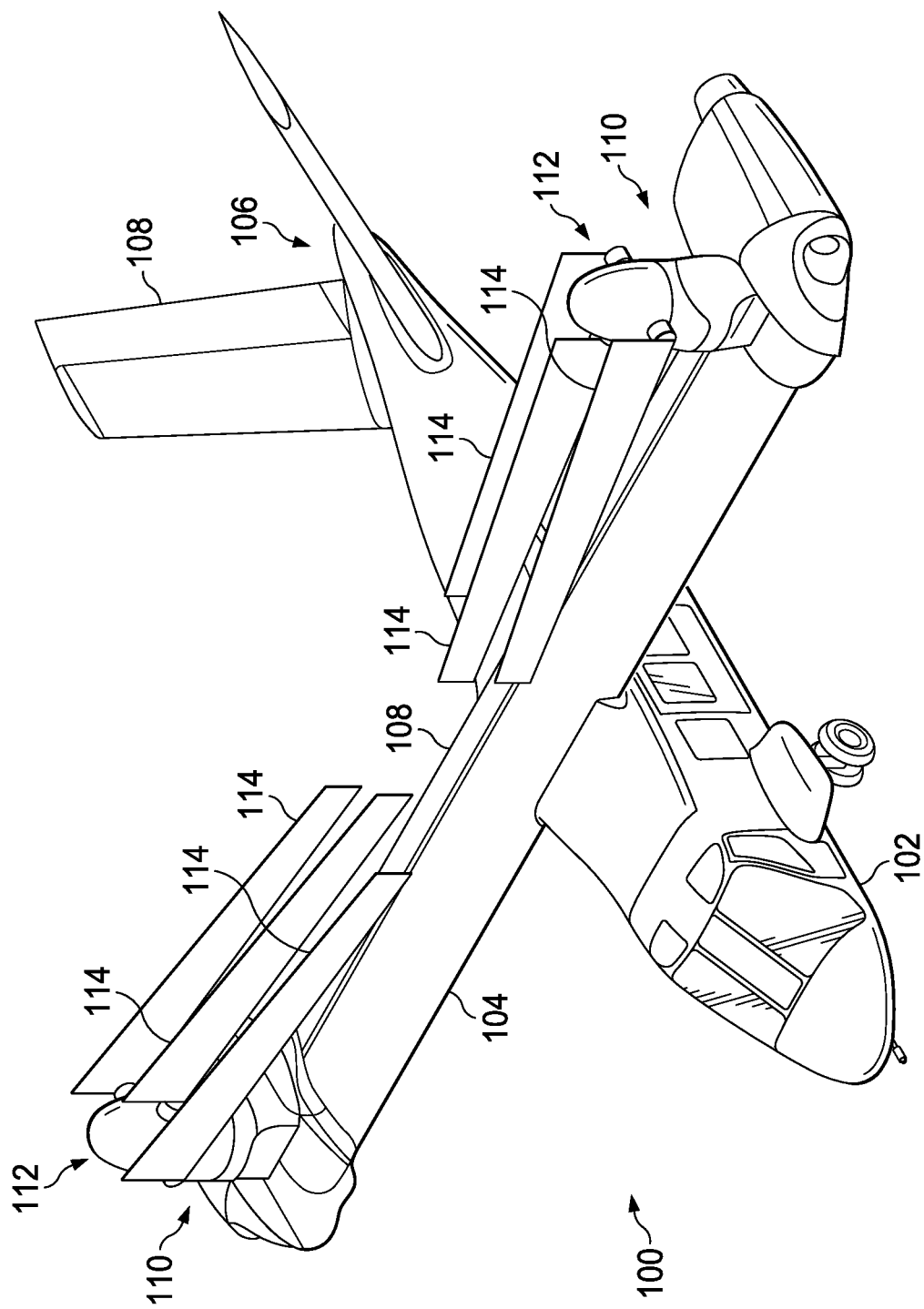
FIG. 2 is an oblique view of the rotorcraft of FIG. 1, shown with rotor blades in folded positions.

Referring to FIGS. 1 and 2 in the drawings, a rotorcraft 100, illustrated as a tiltrotor aircraft, is shown. Rotorcraft 100 comprises a fuselage 102, a wing 104, and a tail assembly 106. Wing 104 and tail assembly 106 include control surfaces 108 operable for horizontal and/or vertical stabilization during forward flight. Pylon assemblies 110 that are rotatable relative to wing 104 between a generally vertical orientation, as seen in FIG. 1, and a generally horizontal orientation (not shown) are located proximate outboard ends of wing 104. Each pylon assembly 110 houses a portion of a drive system that is used to rotate rotor assemblies 112. Each rotor assembly 112 comprises a plurality of rotor blades 114. FIG. 1 shows rotor blades 114 in a deployed position, ready for flight. FIG. 2 shows rotor blades 114 in a folded position, ready for storage. In addition to folding rotor blades 114 for storage, wing 104 may rotate relative to fuselage 102 to further decrease the footprint of rotorcraft 100.

Figure 3:
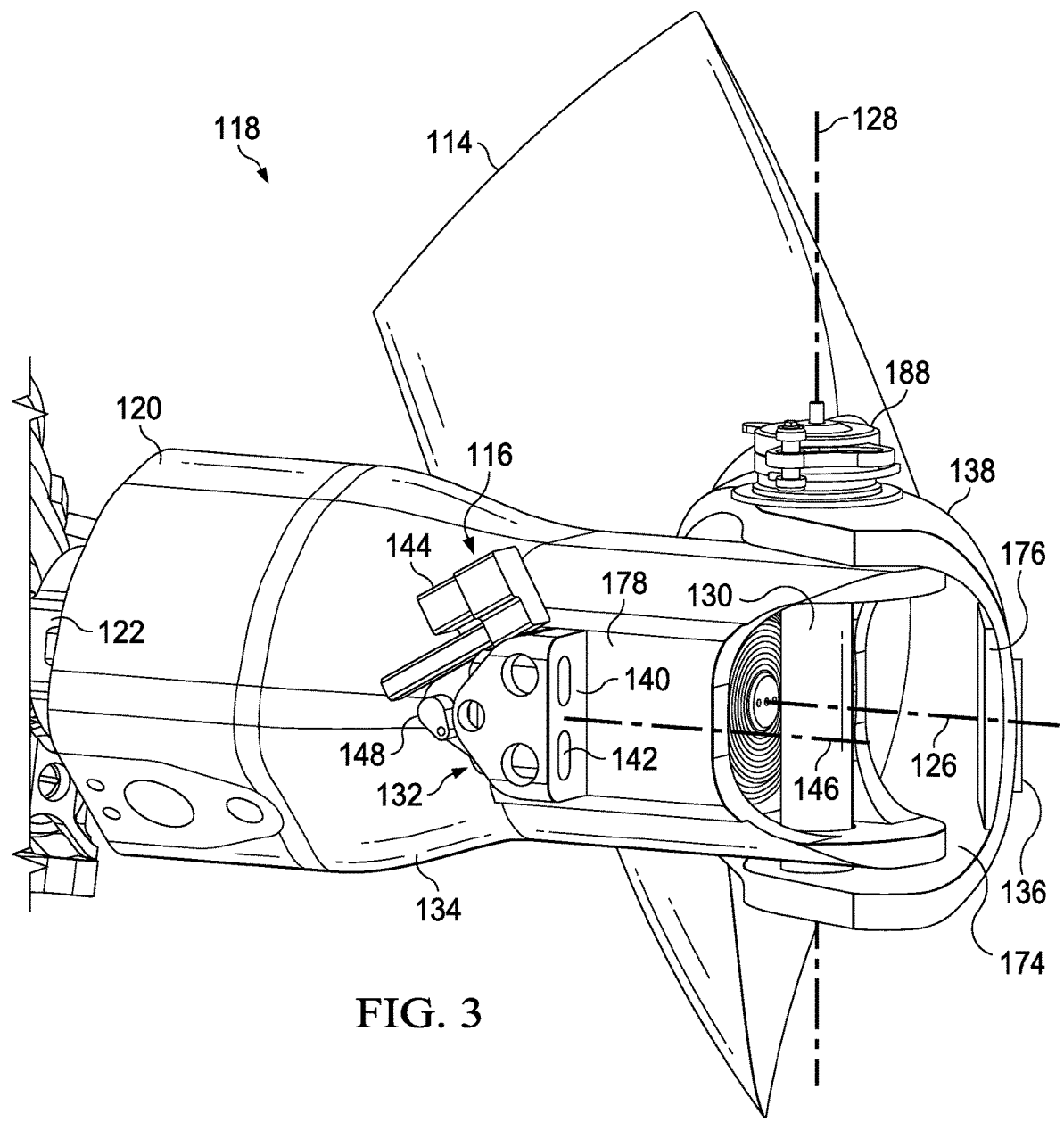
FIG. 3 is an oblique view of a folding rotor blade assembly including a locking mechanism and a rotor blade, shown with the locking mechanism in an unlocked position and with the rotor blade in a folded position, in accordance with this disclosure.
Figure 4:
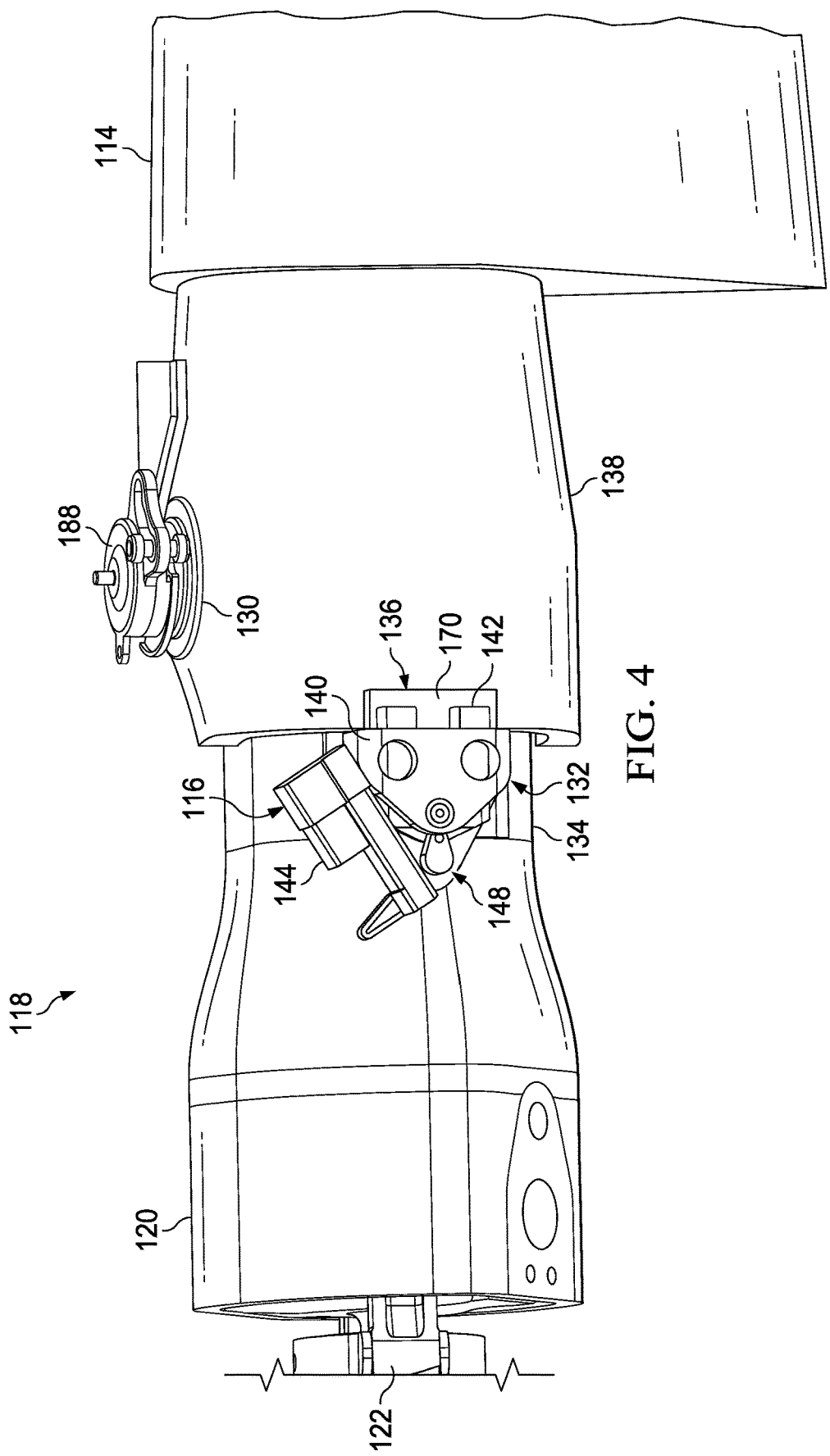
FIG. 4 is an oblique view of a portion of the folding rotor blade assembly and the locking mechanism of FIG. 3, shown with the locking mechanism in a locked position and with the rotor blade in an extended position.

Because rotor blades 114 are foldable, they must have locking mechanisms capable of maintaining rotor blades 114 in the deployed position during flight. FIGS. 3-7 show a rotor blade locking assembly 116 for maintaining rotor blade 114 in the deployed position. FIG. 3 shows a rotor blade assembly 118 with rotor blade 114 in the folded position and rotor blade locking assembly 116 in the unlocked position and FIG. 4 shows rotor blade assembly 118 with rotor blade 114 in the deployed position and rotor blade locking assembly 116 in the locked position. Rotor blade assembly 118 comprises a blade grip 120 rotatably coupled to an arm 122 of a rotor hub 124 about a pitch-change axis 126, rotor blade 114 rotatably coupled to blade grip 120 about a blade-fold axis 128 via a blade bolt 130, and rotor blade locking assembly 116.

Figure 5:
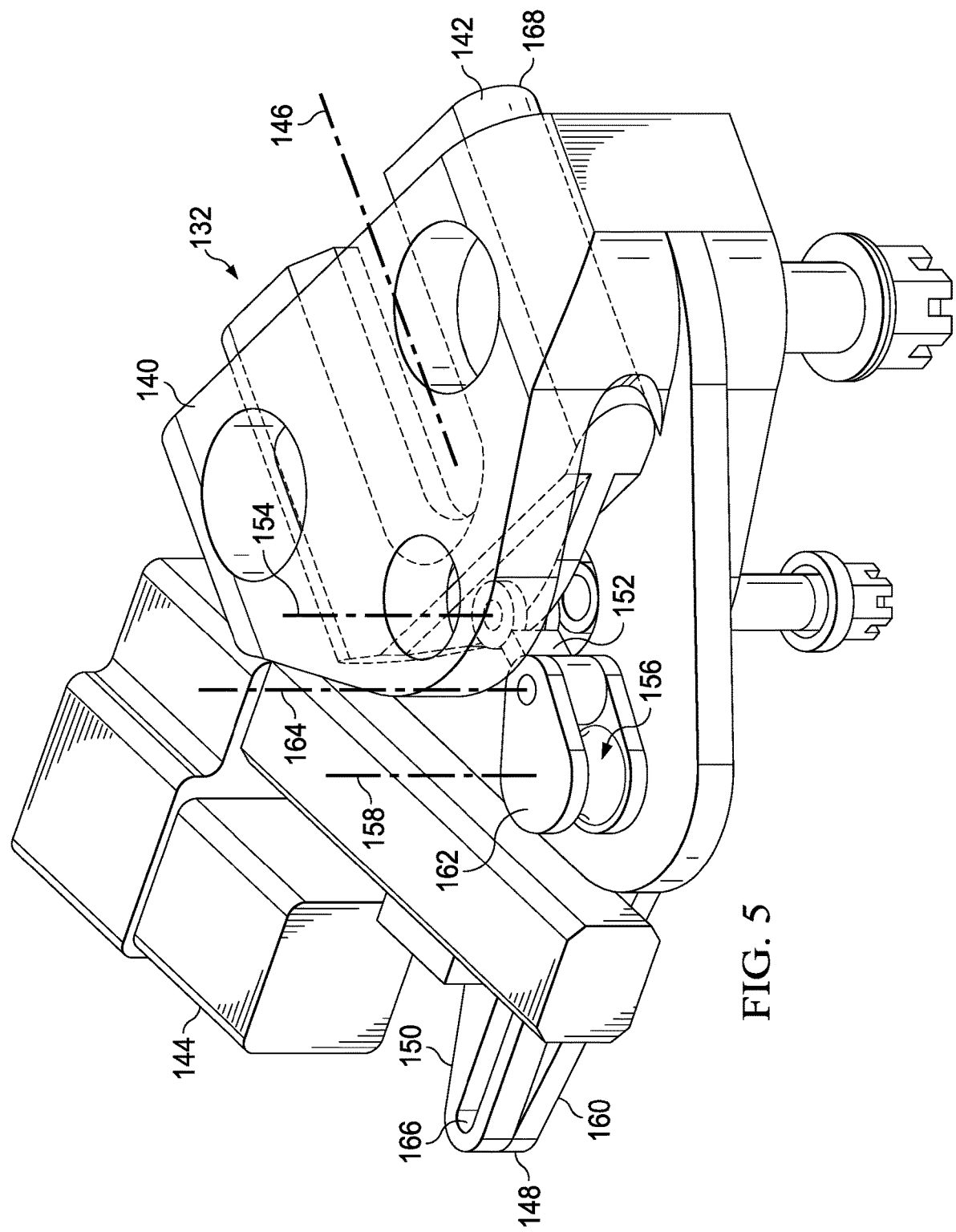
FIG. 5 is an oblique view of the locking mechanism of FIG. 3.

Rotor blade locking assembly 116 comprises a locking mechanism 132 coupled to an exterior surface 134 of blade grip 120 and a locking plate 136 coupled to an exterior surface 138 of rotor blade 114. As best shown in FIG. 5, locking mechanism 132 comprises a housing 140 with a latch 142 at least partially received therein, and an actuator 144 configured to cause latch 142 to linearly translate along a locking axis 146 between the unlocked position (retracted) and the locked position (extended). Locking axis 146 is generally parallel to pitch-change axis 126. Movement of actuator 144 is imparted to latch 142 through a linkage 148. Linkage 148 comprises a crank slider 150 coupled to actuator 144, a pre-load link 152 rotatably coupled to latch 142 about a latch-link axis 154, and a bell crank 156 rotatably coupled to housing 140 about a crank axis 158. Bell crank 156 comprises a first arm 160 slidably coupled to crank slider 150 and a second arm 162 rotatably coupled to pre-load link 152 about an arm-link axis 164. First arm 160 comprises a peg (not shown) configured to fit at least partially within, and slide along, a slot 166 in crank slider 150. As crank slider 150 translates, the peg of first arm 160 slides along slot 166, rotating first arm 160, and causing bell crank 156 to rotate about crank axis 158. The rotation of bell crank 156 is transmitted through second arm 162 to pre-load link 152, which rotates relative to bell crank 156 and latch 142 about arm-link axis 164 and latch-link axis 154, respectively, and pushes (or pulls) latch 142 out of (or into) housing 140 along locking axis 146. Latch-link axis 154, arm-link axis 164, and crank axis 158 are substantially parallel to each other, and they are generally perpendicular to locking axis 146. And when latch 142 is extended into the locked position, latch-link axis 154, arm-link axis 164, and crank axis 158 are oriented relative to each other such that locking axis 146 intersects all three of them. This configuration prevents latch 142 from linearly translating from the locked position to the unlocked position without input from actuator 144. This configuration also provides operational safety against malfunction of actuator 144.

The configuration of linkage 148 also serves another valuable function; it multiplies the force applied from actuator 144 to latch 142. The greater length of first arm 160 than second arm 162 causes a greater magnitude of force to be applied by second arm 162, which results in latch 142 being advanced with a greater linear force than actuator 144 is capable of exerting directly. This may be advantageous in producing a larger pre-load force. A large pre-load force is helpful because rotor blades 114 experience large forces during operation, and it is imperative that rotor blades 114 are not permitted to rotate about blade-fold axis 128 due to those forces. In order to create a pre-load force to prevent this rotation about blade-fold axis 128, latch 142 comprises a contact surface 168 configured to contact and bear against a bearing surface 170 of locking plate 136 and one, or both, of contact surface 168 and bearing surface 170 are angled relative to each other. Relatively angled surfaces 168 and 170 create a pre-load force normal to locking axis 146 as latch 142 is translated from the unlocked position to the locked position. Alternatively, the pre-load force may be generated by angling locking axis 146 slightly towards pitch-change axis 126.

Rotor blade 114 comprises a generally C-shaped portion 172 that extends beyond blade-fold axis 128. Locking plate 136 is preferably coupled to exterior surface 138 of C-shaped portion 172 of rotor blade 114. Because the force of latch 142 locking rotor blade 114 in the deployed position is applied to C-shaped portion 172, a spanwise spar of rotor blade 114 extends through C-shaped portion 172. An interior surface 174 of C-shaped portion 172 is configured to contact exterior surface 134 of blade grip 120. In order to protect blade grip 120 and rotor blade 114 from damaging each other, interior surface 174 of C-shaped portion, as well as exterior surface 134 of blade grip 120, may include a buffer material 176 and a buffer material 178, respectively.

Figure 6:
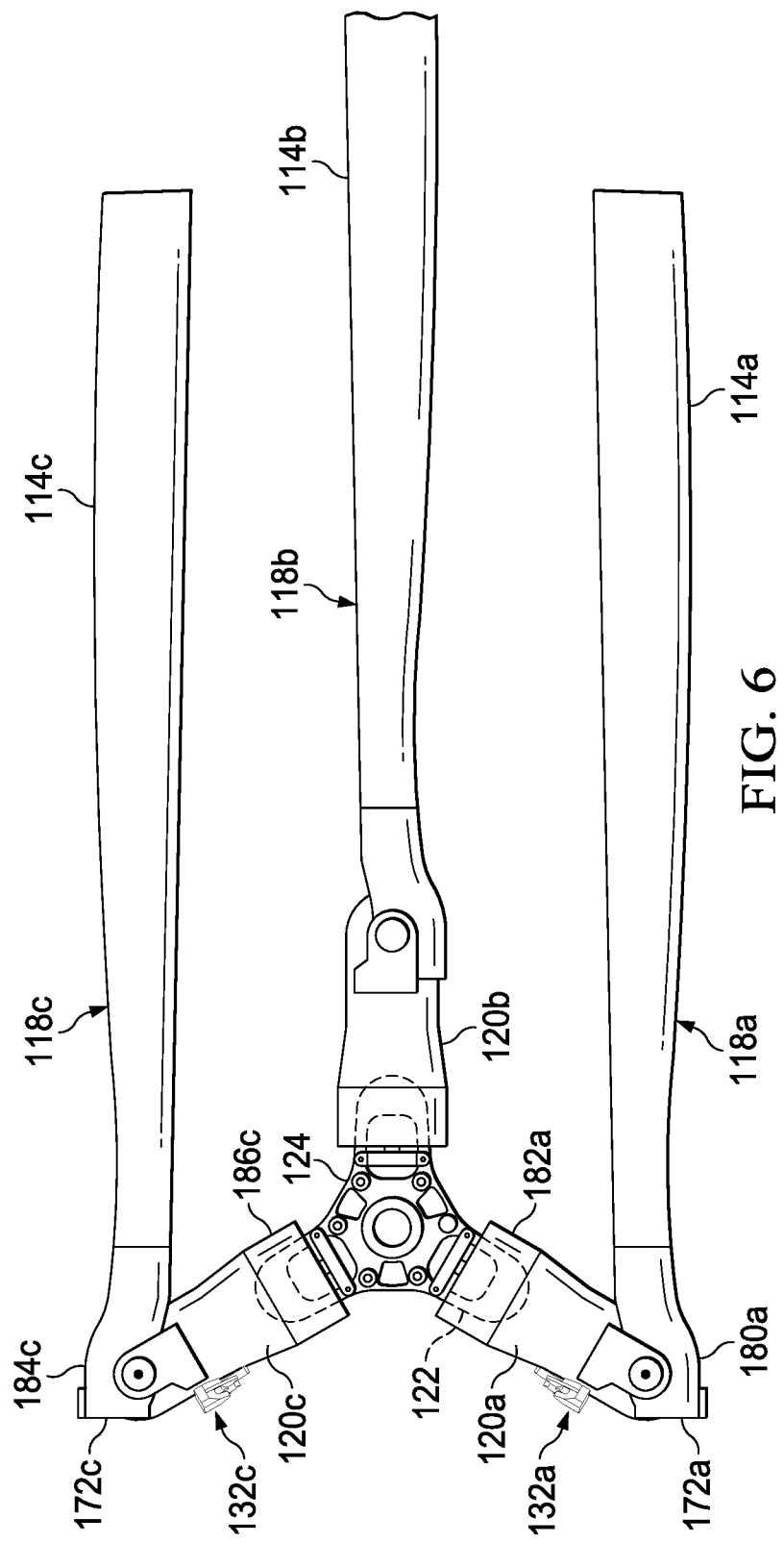
FIG. 6 is a top view of a rotor assembly including two of the rotor blade assemblies and two of the locking mechanisms of FIG. 3.
Figure 7:
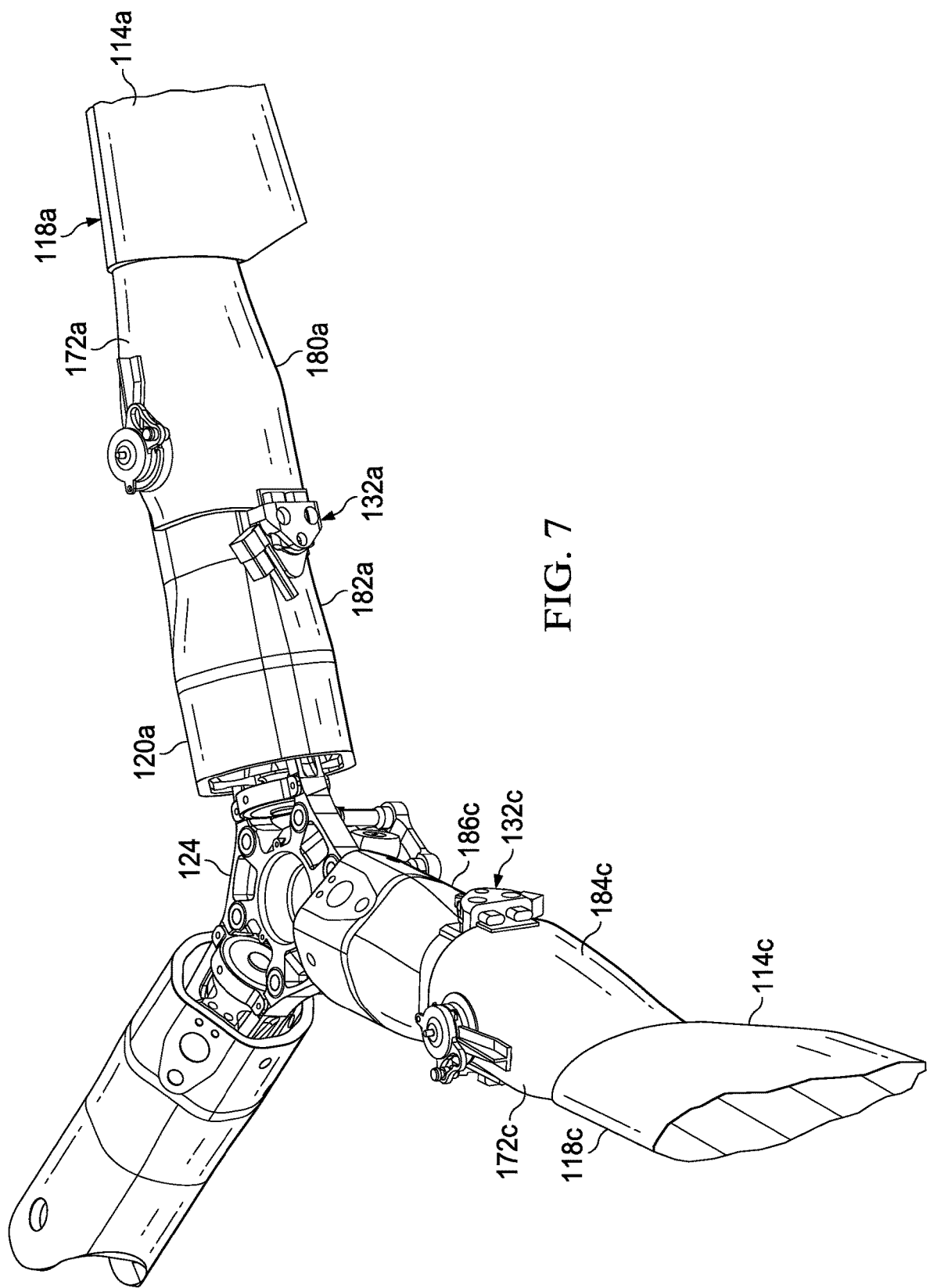
FIG. 7 is an oblique view of a portion of the rotor assembly of FIG. 6.
Figure 8:
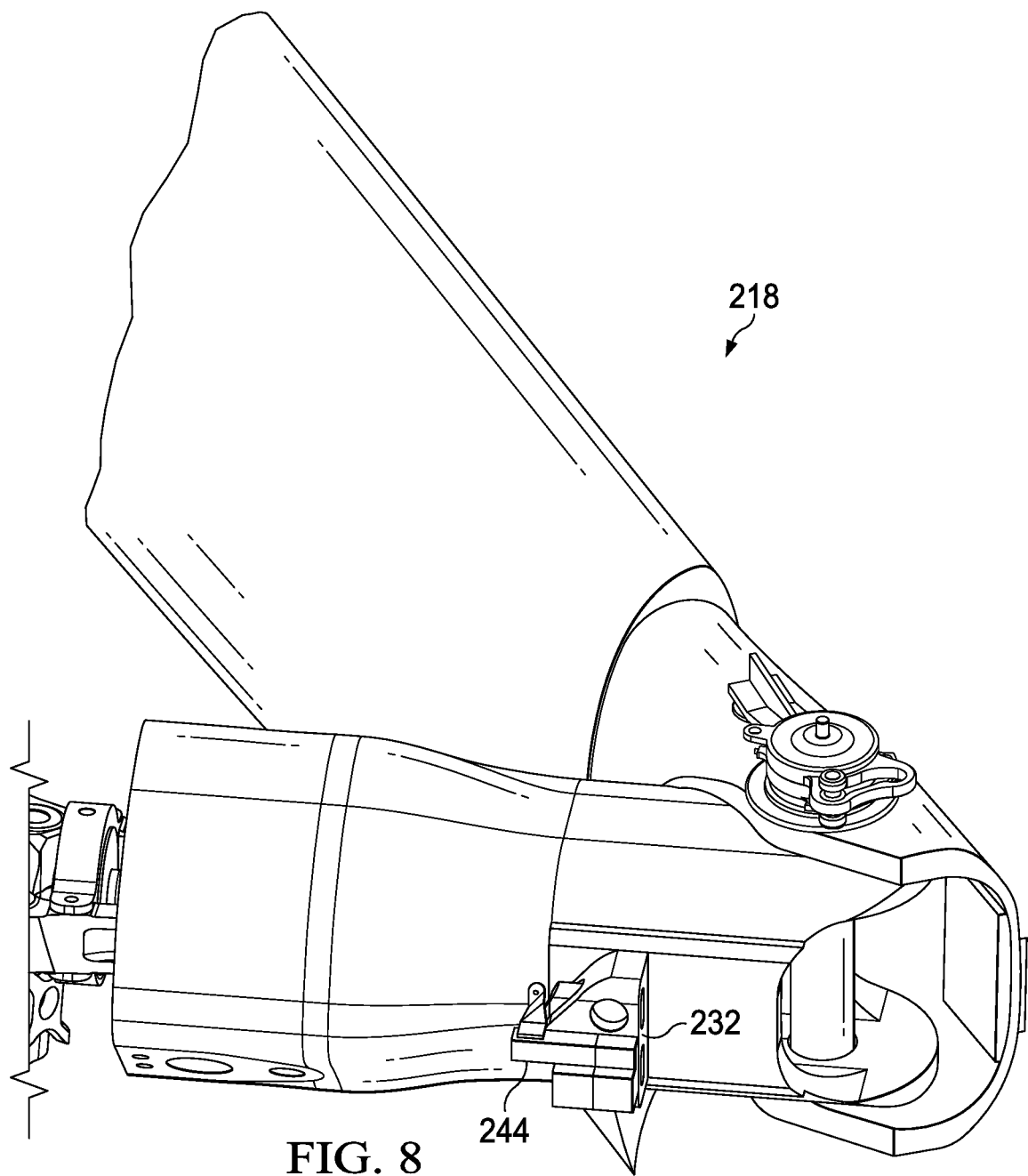
FIG. 8 is an oblique view of another folding rotor blade assembly including a blade mechanism and a rotor blade, shown with the locking mechanism in an unlocked position and with the rotor blade in a folded position.
Figure 9:
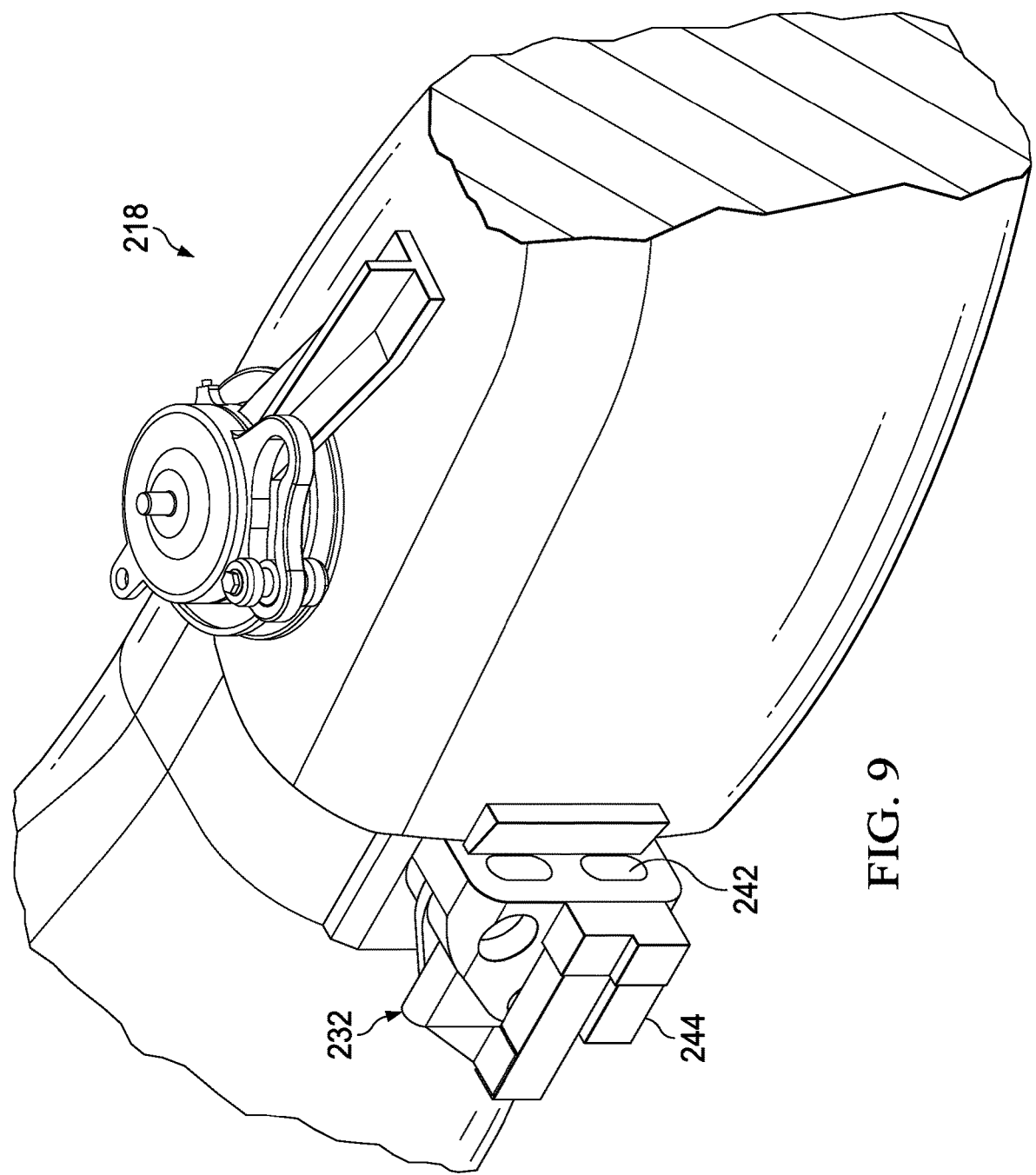
FIG. 9 is an oblique view of a portion of the folding rotor blade assembly of FIG. 8, shown with the locking mechanism in the unlocked position and with the rotor blade in an extended position.
Figure 10:
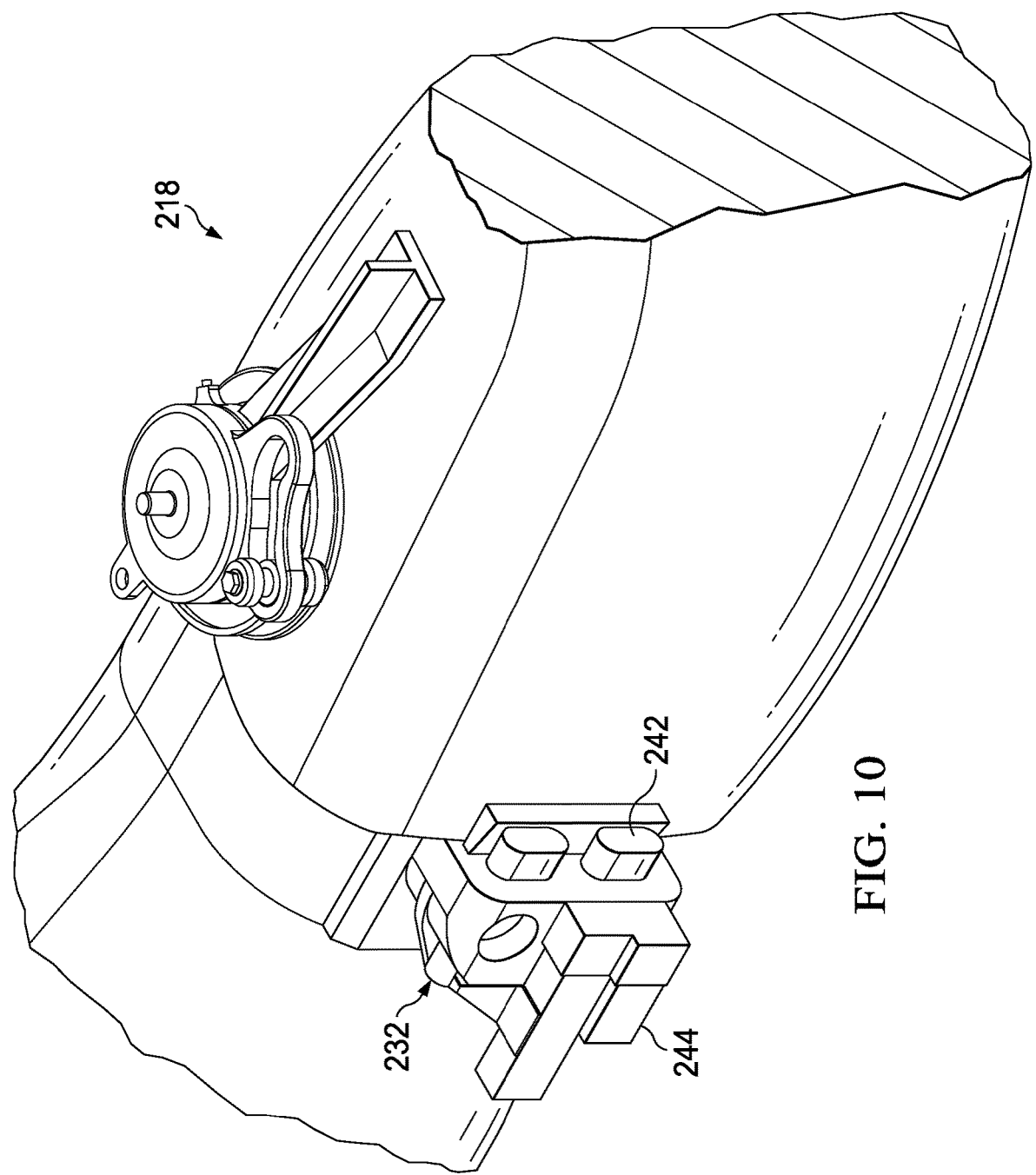
FIG. 10 is an oblique view of a portion of the folding rotor blade assembly of FIG. 8, shown with the blade locking mechanism in a locked position and with the rotor blade in an extended position.
Figure 11:
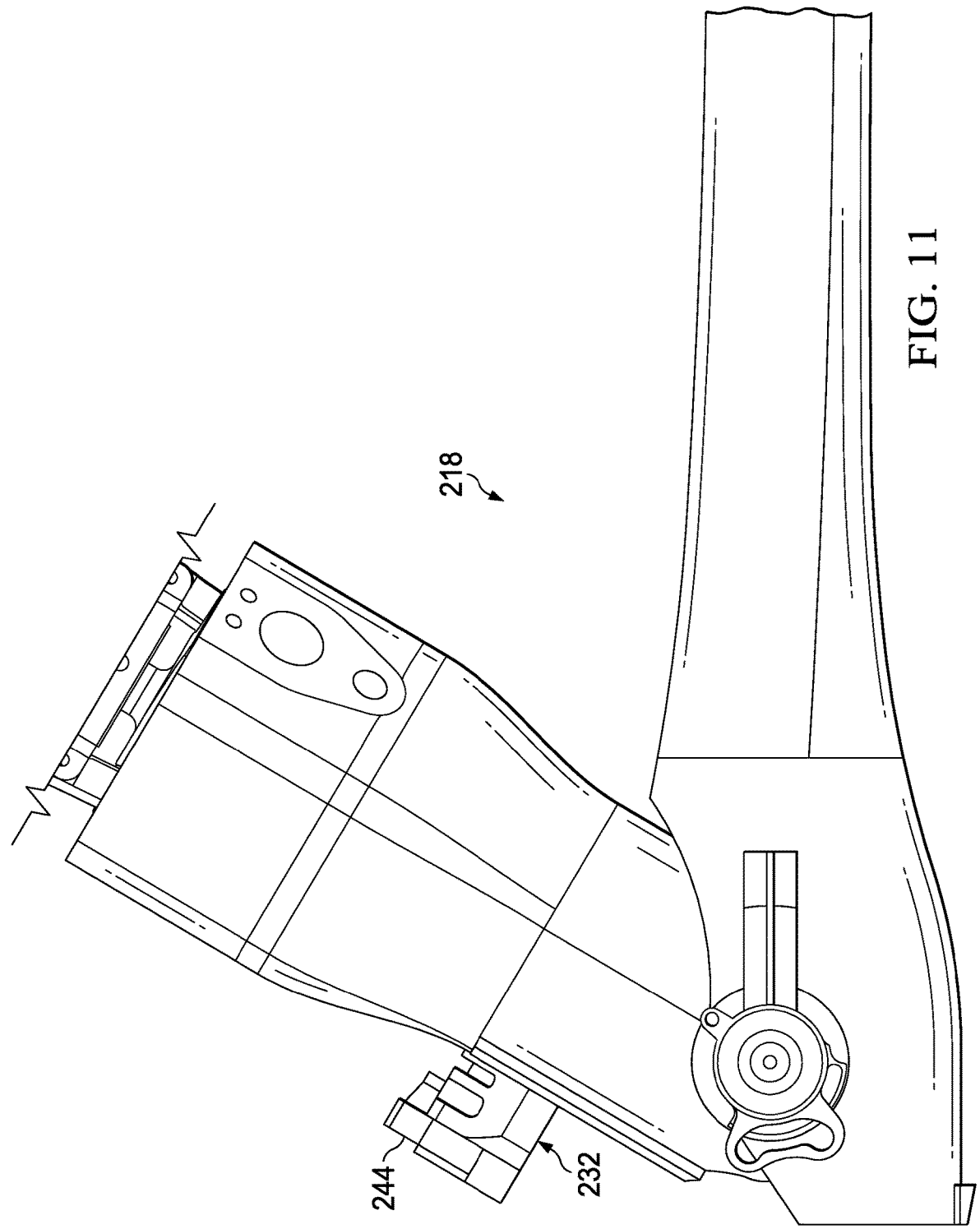
FIG. 11 is a top view of a portion of the folding rotor blade assembly of FIG. 8, shown with the locking mechanism in the unlocked position and with the rotor blade in the folded position.
Figure 12:
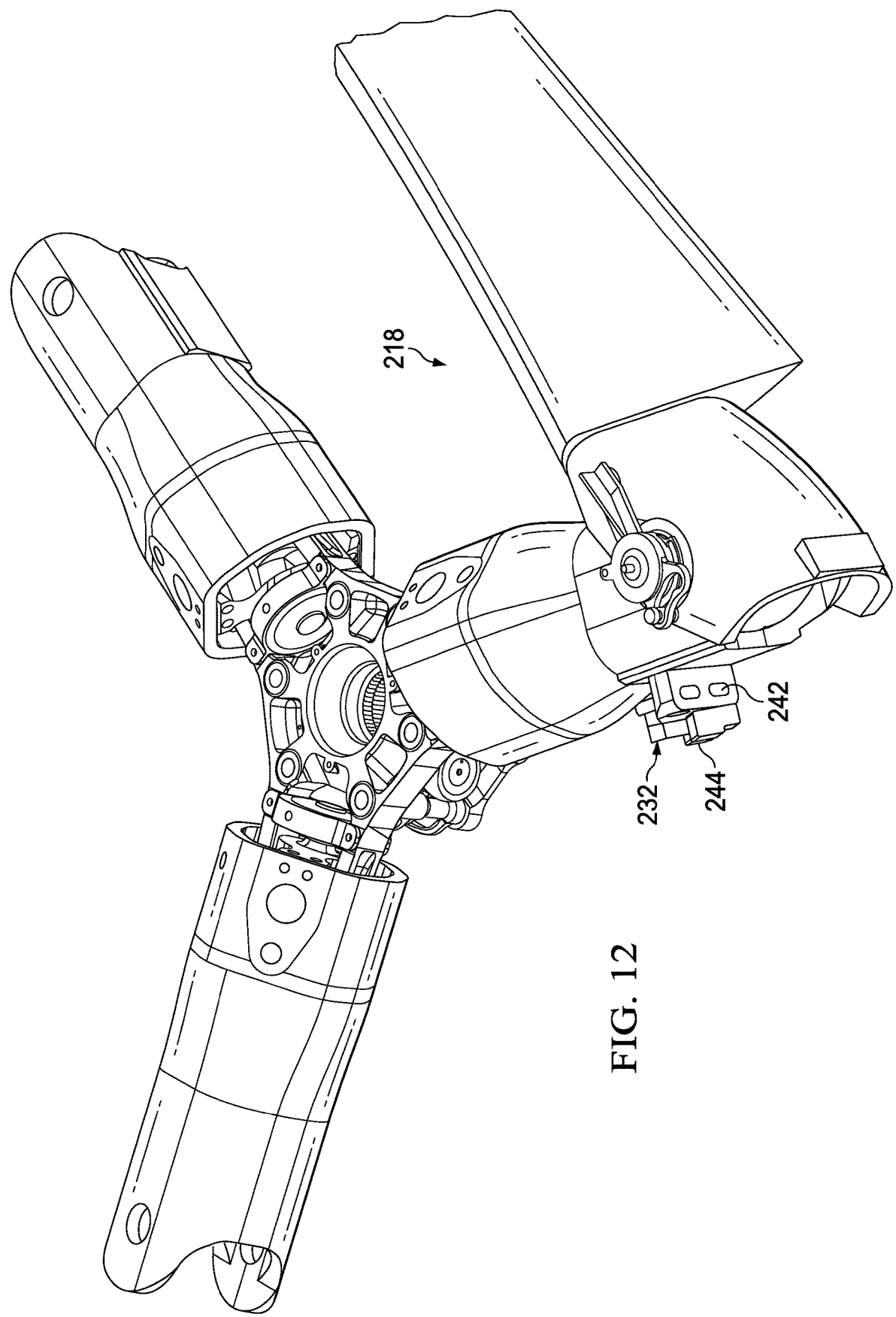
FIG. 12 is an oblique view of a portion of a rotor assembly including the folding rotor blade assembly of FIG. 8, shown with the locking mechanism in the unlocked position and with the rotor blade in the folded position.

As shown in FIGS. 2 and 6, on a three-bladed rotor, such as rotor assemblies 112, it is only necessary to fold two rotor blades 114 for efficient storage. Accordingly, with reference to FIGS. 6 and 7, the separate rotor blade assemblies 118 will be identified utilizing (a), (b), and (c). As shown, rotor blades 114a and 114c are configured to be folded and rotor blade 114b is not. Rotor blades 114a and 114c are very similar, however, because they are configured to fold in different directions, rotor blade 114a comprises C-shaped portion 172a extending from a top 180a of rotor blade 114a and locking mechanism 132a is coupled to a corresponding top 182a of blade grip 120a. Whereas rotor blade 114c comprises C-shaped portion 172c extending from a bottom 184c of rotor blade 114c and locking mechanism 132c is coupled to a corresponding bottom 186c of blade grip 120c.

In operation, rotor blades 114 are extended from the folded position, either manually, or by utilizing blade-fold motors 188. Blade-fold motors 188 may be partially, or entirely, disposed within blade bolts 130, or otherwise configured to provide the selective rotation. After deploying rotor blades 114, actuators 144 are actuated which causes translation of latches 142 along locking axes 146. As latches 142 translate, contact surfaces 168 wedge against bearing surfaces 170 creating pre-load forces therebetween. Rotor blades 114 are then rotated about pitch-change axes 126 and rotorcraft 100 is prepared for vertical takeoff. After flight, rotorcraft 100 may be prepared for storage by reversing the process.

Referring to FIGS. 8-12, a rotor blade assembly 218 is shown. Rotor blade assembly 218 is structurally similar to rotor blade assembly 118 except for a locking mechanism 232 differs from locking mechanism 132. Whereas locking mechanism 132 comprises linkage 148 to provide additional safety as well as amplifying the force of actuator 144, locking mechanism 232 omits a linkage in favor of utilizing an actuator 244 to directly impart translation of a latch 242 between an unlocked position and a locked position. Given that rotor blade assembly 218 removes additional weight and complexity, at the expense of a built-in safeguard, it may be particularly well-suited for use on smaller, lighter, unmanned rotorcraft.

In addition to the features shown in FIGS. 1-12 and described above, other features may be included or substituted. For example, a latch may rotate into engagement with a locking plate; a locking mechanism may be placed on a leading or trailing end of a rotor blade and have a latch slide into an opening with an interference fit for creating pre-load; multiple locking mechanisms may be utilized; a locking mechanism may be coupled to a rotor blade with a corresponding locking plate coupled to a blade grip; a locking mechanism may be coupled to an internal surface of a blade grip with a latch extending to an external surface of a rotor blade; etc. Moreover, while the disclosed rotor blade locking assemblies are shown and discussed for use on a tiltrotor aircraft, they can be used on any foldable blades that must be locked when in a deployed position.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotor blade locking assembly, comprising:
a locking mechanism configured to be coupled to a blade grip, the locking mechanism comprising:
a latch having a contact surface; and
an actuator configured to cause movement of the latch between an unlocked position and a locked position; and
a locking plate configured to be coupled to a rotor blade, the locking plate having a bearing surface configured to bear against the contact surface of the latch when the latch is in the locked position;
wherein a substantially tubular wall of the blade is selectively captured between the latch and the blade grip.

2. The rotor blade locking assembly of claim 1, wherein the locking mechanism further comprises a housing that receives at least a portion of the latch therein.

3. The rotor blade locking assembly of claim 2, wherein the latch is configured to linearly translate along a locking axis between the locked position and the unlocked position.

4. The rotor blade locking assembly of claim 3, wherein the locking mechanism further comprises a linkage coupled between the actuator and the latch, the linkage being configured to prevent linear translation of the latch from the locked position to the unlocked position without input from the actuator.

5. The rotor blade locking assembly of claim 4, wherein the bearing surface of the locking plate and/or the contact surface of the latch are configured to cause a pre-load force between the latch and the locking plate when the latch is translated from the unlocked position to the locked position.

6. The rotor blade locking assembly of claim 5, wherein the linkage comprises:
a crank slider coupled to the actuator;
a pre-load link rotatably coupled to the latch about a latch-link axis; and
a bell crank having a first arm slidably coupled to the crank slider and a second arm rotatably coupled to the pre-load link about an arm-link axis, the bell crank being configured to rotate relative to the housing about a crank axis.

7. The rotor blade locking assembly of claim 6, wherein the latch-link axis, the arm-link axis, and the crank axis are substantially parallel to each other, and when the latch is in the locked position, the locking axis is generally perpendicular to, and intersects each of, the latch-link axis, the arm-link axis, and the crank axis.

8. A rotor blade assembly, comprising:
a blade grip configured to be rotatably coupled to a rotor hub about a pitch-change axis;
a locking mechanism coupled to the blade grip, the locking mechanism comprising:
a latch having a contact surface; and
an actuator configured to cause movement of the latch between an unlocked position and a locked position;
a rotor blade rotatably coupled to the blade grip about a blade-fold axis; and
a locking plate coupled to the rotor blade, the locking plate having a bearing surface configured to bear against the contact surface of the latch when the latch is in the locked position;
wherein a substantially tubular wall of the blade is selectively captured between the latch and the blade grip.

9. The rotor blade assembly of claim 8, wherein the locking mechanism is coupled to an exterior surface of the blade grip and the locking plate is coupled to an exterior surface of the rotor blade.

10. The rotor blade assembly of claim 9, wherein the rotor blade comprises a generally C-shaped portion that extends beyond the blade-fold axis, the C-shaped portion having an interior surface configured to contact the exterior surface of the blade grip.

11. The rotor blade assembly of claim 10, wherein the latch is configured to linearly translate along a locking axis between the locked position and the unlocked position, the locking axis being generally parallel to the pitch-change axis.

12. The rotor blade assembly of claim 11, further comprising:
a blade bolt having a blade-fold motor disposed at least partially therein, the blade-fold motor being configured to rotate the rotor blade, about the blade-fold axis, between a folded position and a deployed position.

13. The rotor blade assembly of claim 12, wherein a spar of the rotor blade extends into the C-shaped portion.

14. The rotor blade assembly of claim 13, wherein the exterior surface of the blade grip and the interior surface of the C-shaped portion include buffer materials where they are in contact each other.

15. A rotorcraft, comprising:
a fuselage; and
a rotor assembly, comprising:
a rotor hub having an arm; and
a rotor blade assembly, comprising:
a blade grip rotatably coupled to the arm of the rotor hub about a pitch-change axis;
a rotor blade rotatably coupled to the blade grip about a blade-fold axis; and
a locking mechanism coupled to the blade grip, the locking mechanism comprising:
a latch having a contact surface;

an actuator configured to cause movement of the latch between an unlocked position and a locked position; and a locking plate coupled to the rotor blade, the locking plate having a bearing surface configured to bear against the contact surface of the latch when the latch is in the locked position;

wherein a substantially tubular wall of the blade is selectively captured between the latch and the blade grip.

16. The rotorcraft of claim 15, wherein the rotor blade comprises a generally C-shaped portion that extends beyond the blade-fold axis, the C-shaped portion having an interior surface configured to contact an exterior surface of the blade grip.

17. The rotorcraft of claim 16, wherein the locking mechanism is coupled to the exterior surface of the blade grip and the locking plate is coupled to an exterior surface of the C-shaped portion of the rotor blade.

18. The rotorcraft of claim 17, further comprising:

a blade bolt having a blade-fold motor disposed at least partially therein, the blade-fold motor being configured to rotate the rotor blade, about the blade-fold axis, between a folded position and a deployed position.

19. The rotorcraft of claim 18, wherein the latch is configured to linearly translate along a locking axis between the locked position and the unlocked position, the locking axis being generally parallel to the pitch-change axis.

20. The rotorcraft of claim 19, wherein the bearing surface of the locking plate and/or the contact surface of the latch are configured to cause a pre-load force between the latch and the locking plate when the latch is translated from the unlocked position to the locked position.

* * * * *